Patented June 26, 1934

1,964,006

UNITED STATES PATENT OFFICE 1,964,006

FABRIC CLEANING COMPOSITION

Eugene C. Pailler, Rutherford, N. J., assignor, by mesne assignments, to Silk-Eze Corporation, Boston, Mass., a corporation of Delaware No Drawing. Application March 25, 1929, Serial No. 349,911

5 Claims. (Cl. 87—5)

This invention has for its prime object the production of a composition highly effective in cleaning and removing spots or stains from fabrics; especially silks and woolens. A further object is the provision of a cleaning composition which will accomplish its intended functions without injury to the fabrics. I have produced a composition which fulfills these requirements, which composition moreover is readily soluble in water and may thus be conveniently utilized.

My cleaning composition comprises a soap preferably a vegetable oil soap; and a soluble sulphonated fat or oil such as sulphonated tallow, sulphonated olive oil, sulphonated castor oil, or Turkey red oil. I also prefer to include in the composition an alkali soluble albuminoid, such as sericin, gelatin, keratin, or casein, whereby proofing of the fabric against water-spotting is effected and a finished effect imparted thereto. I further include a soluble volatile alkali salt, such as ammonium chloride or other soluble ammonium salt, for neutralizing any fatty acid in the composition. An emulsifying agent soluble in water, such as gum acacia or other water soluble gum may, if desired, also be added.

In preparing the composition I prefer to use the ingredients in about the following proportions—viz, one hundred pounds of a vegetable oil soap (for example, olive oil soap, palm oil soap, peanut oil soap, or soap made from mixtures of such oils); five pounds of sericin (or gelatin, keratin, or casein); four ounces of ammonium chloride; and two ounces of gum acacia. The above ingredients are thoroughly mixed by suitable agitation and to the mixture is added thirty six ounces of sulphonated olive oil (or sulphonated castor oil, Turkey red oil, or a mixture of said oils, or thirty-six ounces of sulphonated tallow). The mixture is again stirred or agitated to effect thorough mixing.

The above proportions may be varied. Good results may be obtained, for example, by increasing the proportion of soluble albuminoids to ten pounds per hundred pounds of soap. Likewise, the proportion of sulphonated oil or fat may be increased to forty-eight ounces per hundred pounds of soap, with good effects. Similarly the proportion of ammonium chloride may be raised, for example, to eight ounces per one hundred pounds of soap, depending upon the neutralizing effect desired. The amount of gum acacia may be likewise increased, as for example to eight ounces. The proportionate amounts of the aforesaid ingredients may indeed be increased or diminished beyond the range of figures here specified, depending upon the strength and results desired.

The various ingredients may be added to and mixed with the soap while it is in liquid or semi-liquid form during its process of manufacture; or they may be added and mixed with the soap after it has been dried.

The composition may be readily utilized for cleaning purposes by dissolving it in water. I find that effective results may be obtained by using one tablespoonful of the composition to a basinful of luke warm water. The solution is then agitated to form suds and the fabric is immersed therein. The suds are then pressed through the fabric preferably without rubbing. Following this the fabric is rinsed in luke warm water and the water then squeezed out preferably without wringing.

My composition is highly effective as a cleaner and spot remover for fabrics, especially silks and woolens, and accomplishes its functions without injuring the fabrics. It further prevents silks, whether natural or artificial, from being spotted by water. It is efficacious in removing water spots from silks and in rendering them spot-proof; silk, when washed with this composition becoming proof against spotting by water. The composition also effectively cleans woolen fabrics without causing shrinkage thereof.

As I have previously pointed out, I prefer that my composition comprise ingredients which are soluble in water, and in the ensuing claims I intend to cover the composition broadly whether in dry form or in solution.

It will be understood that the terms and expressions employed in the ensuing claims are intended to include equivalents. The expression "sulphonated oil", for example, as used in the claims is to be understood as including sulphonated fats.

What I claim is:

1. A fabric cleaning composition comprising one hundred parts by weight of vegetable oil soap, five to ten parts by weight of an alkali soluble albuminoid, and about three parts by weight of a soluble sulphonated vegetable oil.

2. A fabric cleaning composition comprising 100 parts by weight of vegetable oil soap, five to ten parts by weight of an alkali soluble albuminoid, about three parts by weight of a soluble sulphonated vegetable oil, and a fraction of a part by weight of a soluble ammonium salt.

3. A fabric cleaning composition comprising one hundred parts by weight of vegetable oil soap, five to ten parts by weight of an alkali soluble albuminoid, about three parts by weight of a soluble sulphonated vegetable oil, a fraction of a part by weight of a soluble ammonium salt, and a fraction of a part by weight of an emulsifying agent.

4. A fabric cleaning composition especially adapted for silks and woolens consisting essentially of a mixture of vegetable oil soap and water soluble sulfonated oil and including, in addition to such mixture, an alkali soluble protein of the group consisting of sericin, gelatine, keratin and casein, the quantity of such protein being of the order of 5 to 10 percent. of the weight of the vegetable oil soap, and functioning principally to proof the fabrics, cleaned with said composition, against water-spotting.

5. The composition as claimed in claim 4, including a water-soluble ammonium salt, the quantity thereof being greatly less than that of the soap and sulfonated oil mixture, such salt functioning to neutralize any free fatty acid in the composition and thus prevent spotting of the fabric by such free fatty acid.

EUGENE C. PAILLER.